US009003386B2

(12) United States Patent
Debowski et al.

(10) Patent No.: US 9,003,386 B2
(45) Date of Patent: Apr. 7, 2015

(54) FALLBACK SYSTEM FOR SOFTWARE UPGRADE

(71) Applicants: Mariusz Debowski, Sandhausen (DE); Zawisza Pierzchalski, Heidelberg (DE)

(72) Inventors: Mariusz Debowski, Sandhausen (DE); Zawisza Pierzchalski, Heidelberg (DE)

(73) Assignee: SAP SE, Walldorf (DE)

( * ) Notice: Subject to any disclaimer, the term of this patent is extended or adjusted under 35 U.S.C. 154(b) by 108 days.

(21) Appl. No.: 13/781,219

(22) Filed: Feb. 28, 2013

(65) Prior Publication Data
US 2014/0245276 A1 Aug. 28, 2014

(51) Int. Cl.
G06F 9/445 (2006.01)
G06F 11/14 (2006.01)

(52) U.S. Cl.
CPC . *G06F 8/67* (2013.01); *G06F 11/14* (2013.01)
717/172

(58) Field of Classification Search
None
See application file for complete search history.

(56) References Cited

U.S. PATENT DOCUMENTS

| 6,324,692 | B1 | 11/2001 | Fiske |
|---|---|---|---|
| 6,535,924 | B1 | 3/2003 | Kwok et al. |
| 6,681,390 | B2 | 1/2004 | Fiske |
| 6,950,878 | B2 | 9/2005 | Kwok et al. |
| 7,085,957 | B2 | 8/2006 | Sundareson |
| 7,089,546 | B2 | 8/2006 | Watanabe et al. |
| 7,130,870 | B1 | 10/2006 | Pecina et al. |
| 7,379,419 | B2 | 5/2008 | Collins |
| 7,627,099 | B2 | 12/2009 | Amidi |
| 8,045,686 | B2 | 10/2011 | Amidi |
| 8,200,634 | B2 | 6/2012 | Driesen et al. |
| 8,369,968 | B2* | 2/2013 | Brown et al. .................. 700/82 |
| 2004/0197073 | A1* | 10/2004 | Oesterreicher et al. ......... 386/46 |
| 2006/0015641 | A1* | 1/2006 | Ocko et al. .................... 709/236 |
| 2007/0260733 | A1* | 11/2007 | Havemose et al. ........... 709/226 |
| 2008/0244552 | A1* | 10/2008 | Toeroe .......................... 717/168 |
| 2010/0088281 | A1* | 4/2010 | Driesen et al. ................ 707/641 |
| 2010/0199272 | A1* | 8/2010 | Mahajan et al. .............. 717/171 |
| 2012/0211563 | A1 | 8/2012 | Gannon et al. |
| 2012/0215347 | A1 | 8/2012 | Illingworth et al. |
| 2012/0240107 | A1 | 9/2012 | Brescia |
| 2012/0245447 | A1 | 9/2012 | Karan |
| 2012/0266234 | A1 | 10/2012 | Ocko |
| 2012/0284091 | A1 | 11/2012 | Colavito |

(Continued)

OTHER PUBLICATIONS

"Configure a server farm for minimal downtime during software updates (Office Sharepoint Server 2007)", [Online]. Retrieved from the Internet: <URL: http://technet.microsoft.com/en-us/library/ee514459%28v=office.12%29.aspx>, (Sep. 17, 2009), 24 pgs.

(Continued)

*Primary Examiner* — Don Wong
(74) *Attorney, Agent, or Firm* — Schwegman Lundberg & Woessner, P.A.

(57) ABSTRACT

A computer system includes a processor, an application layer, and a data layer. The application layer includes a primary application layer, and at times of system upgrade or configuration change, a fallback application layer. The data layer includes a first layer that is not affected by a software upgrade or a configuration change, a second data layer that is modified by the software upgrade or the configuration change, and a third data layer that is available to users during the upgrade. The system, and in particular the fallback application layer and the third data layer, allow the system to be available to users during the software upgrade or system configuration change.

20 Claims, 3 Drawing Sheets

(56) References Cited

U.S. PATENT DOCUMENTS

| | | |
|---|---|---|
| 2013/0047148 A1 | 2/2013 | Lui et al. |
| 2013/0048726 A1 | 2/2013 | Cunningham, IV |
| 2013/0087618 A1 | 4/2013 | Zhu et al. |
| 2013/0191342 A1* | 7/2013 | Sreedharan .................. 707/644 |

OTHER PUBLICATIONS

Potter, Shaya, et al., "AutoPod: Unscheduled System Updates with Zero Data Loss", Proceedings of the Second IEEE International Conference on Autonomic Computing (ICAC 2005), (Jun. 2005), 2 pgs.

* cited by examiner

FALLBACK SYSTEM FOR SOFTWARE UPGRADE

TECHNICAL FIELD

The present disclosure relates to computer systems, and in an embodiment, but not by way of limitation, a computer system for insuring the integrity of application data during a software upgrade or a system configuration change.

BACKGROUND

Computer systems at times need maintenance and/or upgrades. To implement such upgrades and configuration changes, the system must normally be taken out of service and made unavailable to users during the implementation of the upgrades and configuration changes. There are existing attempts to remedy or ease the impact of having to take such systems out of service for upgrades and configurations. These attempts can be referred to as high availability solutions or near zero downtime solutions. However, the approach of existing high availability solutions is to provide redundant systems (i.e., technical services) on the technical level only. That is, to provide an exact copy of the system by available technical means (e.g., storage mirroring and additional server hardware) that can be swapped with the original system in case of a failure. In this case, data semantics are not a subject of such solutions. Additionally, existing near zero downtime solutions for software upgrades require a finite system outage for data synchronization. That is, after the completion of the upgrade, the copy of the application data used during the upgrade is compared to the original data that was used just prior to the upgrade, and any differences between the two have to be reconciled.

DETAILED DESCRIPTION

Figure 1:
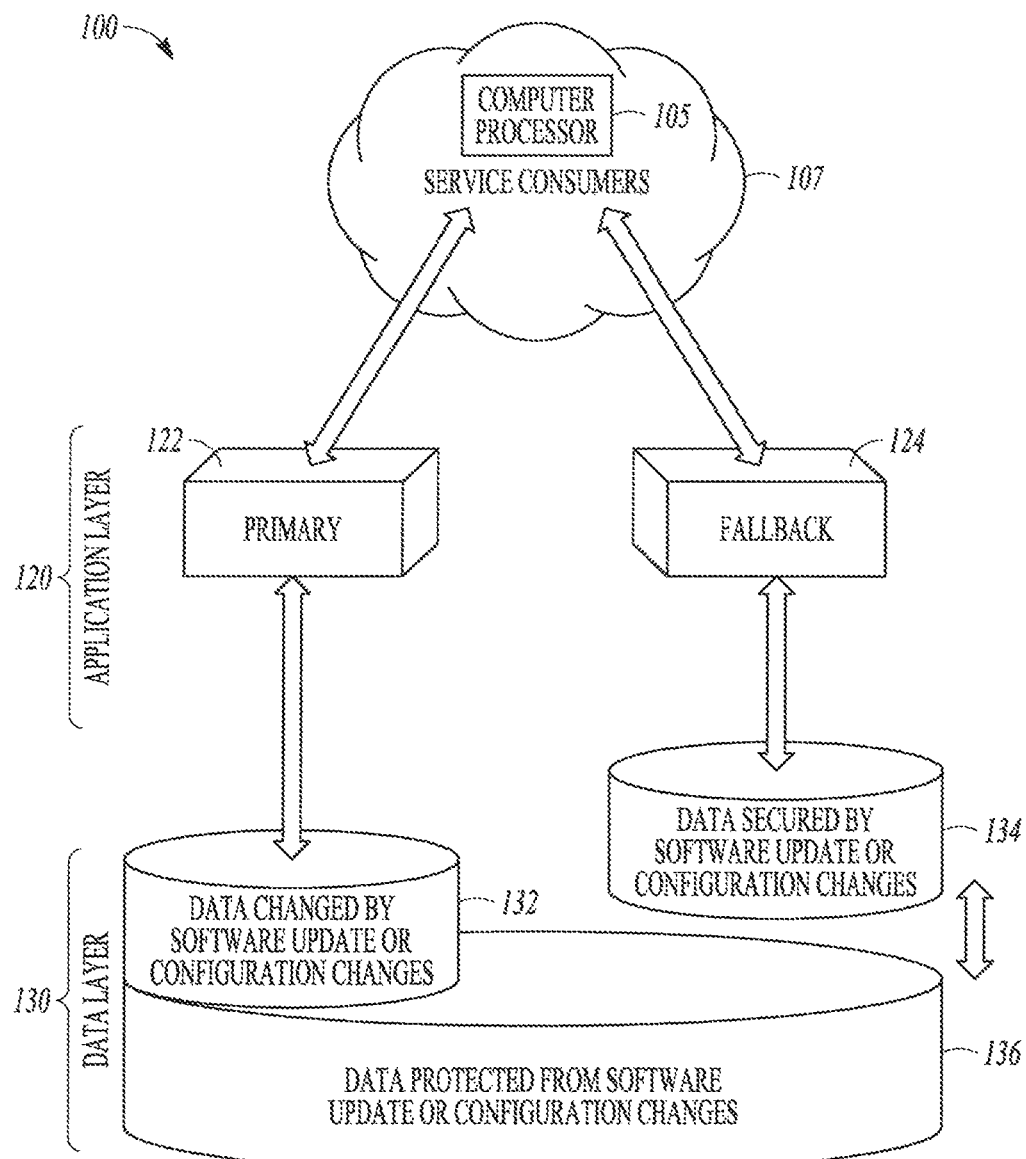
FIG. 1 is a block diagram of an example embodiment of a fallback system for use in connection with a software upgrade.

In the following detailed description, reference is made to the accompanying drawings that show, by way of illustration, specific embodiments in which the invention may be practiced. These embodiments are described in sufficient detail to enable those skilled in the as to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

One or more embodiments of the present disclosure address the shortcomings of current high availability solutions and near zero downtime solutions. In an embodiment, redundant systems are provided on the application level (i.e., functions) instead of the technical level, so that a computer system can be maintained in an up and running state during the implementation of a software upgrade and/or configuration change. One or more embodiments also address the shortcoming of existing near zero downtime solutions wherein such systems require a finite system outage for data synchronization. Such embodiments provide a real non-disruptive software upgrade or configuration change event of a productive system landscape and/or its parts.

FIG. 1 is a block diagram of an example embodiment of a fallback system for use in connection with a software upgrade and/or configuration change. The term fallback system refers to a portion of the system that operates during the software upgrade and/or a configuration change of the computer system, and functions to insure the integrity of the data in the system. For example, in a credit card processing system, there may come a time when the processing charge per transaction has to be changed. The processing charge is not considered application data. Application data are for example the purchase amounts of customers recorded in their credit card transactions. The implementation of such a configuration change would take some real time. Whether that implementation change time is thirty seconds or thirty hours, the integrity of the application data and system must be maintained immediately before the implementation, during the implementation, and immediately after the implementation.

Referring now specifically to FIG. 1, a computer system 100 includes a computer processor 105. The computer processor 105 can be located in a cloud computing environment 107. The computer processor can be part of a system that services a plurality of customers, such as credit card customers. However, the system 100 could be virtually any type of computer system that provides virtually any type of service or function, and a credit card processing system in simply one example.

The system 100 includes an application layer 120 and a data layer 130. The application layer 120 includes a primary application layer 122 and a fallback application layer 124. As will be explained in detail in connection with FIG. 2, the primary application layer executes during times of normal system operation, and the fallback layer is created and operates during times of software upgrades and/or system configuration changes, and functions to protect the integrity of application data during such upgrades and changes. After the completion of the software upgrade or configuration change, the fallback system 124 is disabled. In short, the fallback system 124 allows bridging a non-availability of application services and data when the primary application layer 122 needs to be brought down for a software upgrade or a configuration change. The fall back system 124 permits users to continue to use the system during the upgrade and/or configuration change event, that is, when software upgrade or configuration changes are applied to the primary system 122.

The data layer 130 includes three types of data. A first data layer 136 is application data that are protected from modification by the software upgrade and/o configuration change. In the credit card processing system example, such data would include the application data such as the dollar amounts of credit card transactions by customers. Upgrading software or changing parameters in a configuration (such as the interest rate for a particular credit card) does not touch or change such application data. The first data layer 136 does not reside on either the primary system 122 or the fallback system 124, but is rather shared by the primary system 122 and the fallback system 124.

A second data type 132 is the non-application data that are changed by the software upgrade or configuration change. For example, second data type 132 may be the processing fee charged by a credit card company for each credit card transaction that it processes. The second data type 132 resides on the primary application layer 122.

A third data type 134 is the non-application data that are a copy of the second data type 132 just before the implementation of the software upgrade and/or configuration change. In the example of the credit card processing system, third data type 134 may be the processing fee charged by a credit card company for each credit card transaction that it processes in its original version just before the implementation of the software upgrade and/or configuration change. The third data layer 134 is created by copying the required data of the second data type 132 from the primary system 122, and the third data layer 134 resides on the fallback portion of the system. A running system requires a full data set containing second data type 132 and first data layer 136 for the primary system 122, or containing third data type 134 and first data layer 136 for the fallback system 124.

Figure 2:
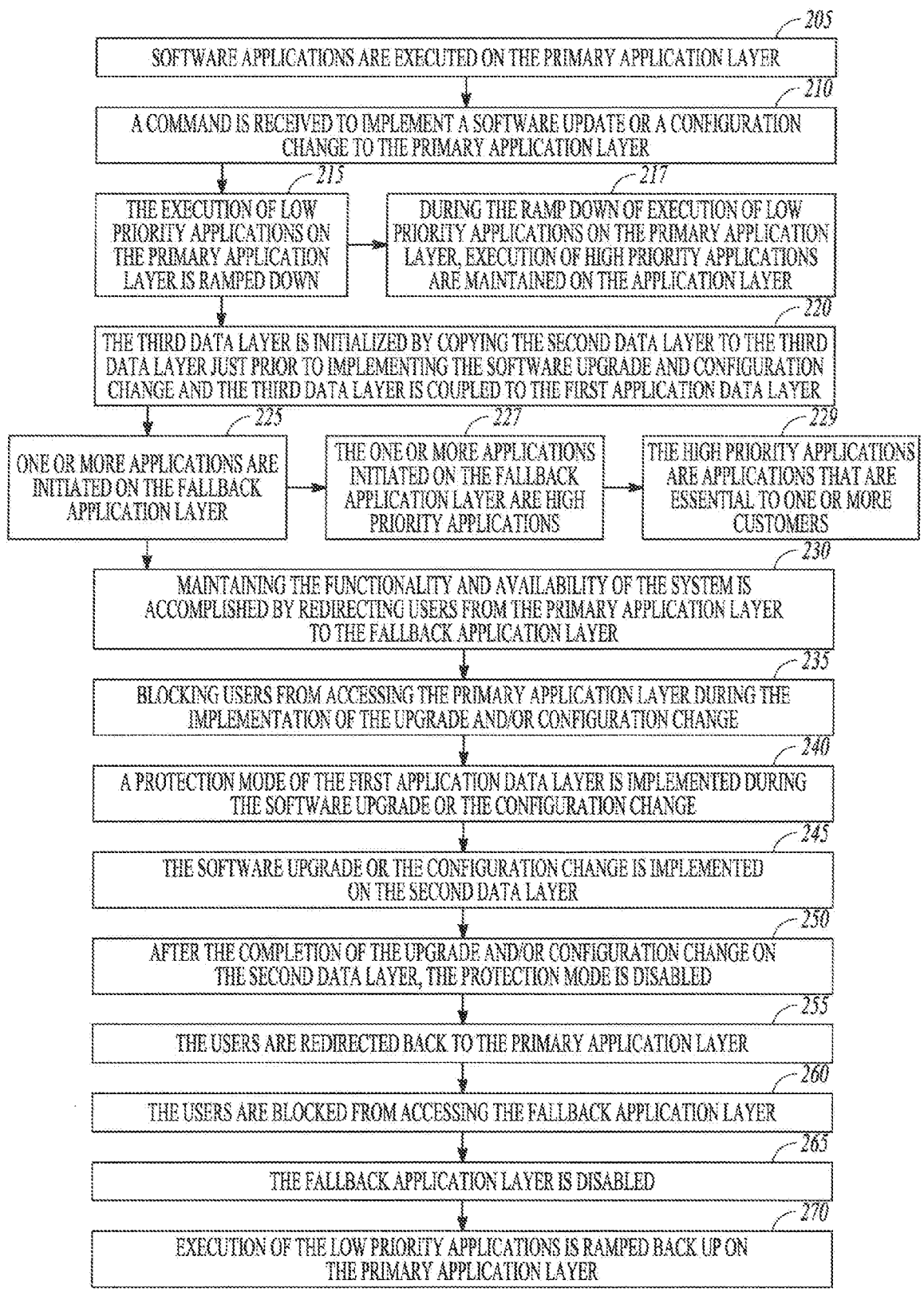
FIG. 2 is a flowchart-like diagram illustrating steps and features of a method and system for preparing and using a fallback system in connection with a software upgrade or configuration change.

FIG. 2 is a flowchart-like diagram of features and steps of an example system and process for using a fallback system in connection with a software upgrade and/or a system configuration change. FIG. 2 includes a number of process blocks 205-270. Though arranged serially in the example of FIG. 2, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIGS. 1 and 2, at 205, software applications are executed on the primary application layer 122. At 210, a command is received to implement a software upgrade or a configuration change to the primary application layer 122. Using the credit card processing system example noted above, a software upgrade could entail a code change to fix a bug or to upgrade or add a feature to the system 100. A configuration change could be a change to a parameter of the system, such as the processing fee charged as a percentage of a sales transaction or the interest rate of a particular credit card.

At 215, the execution of low priority applications on the primary application layer 122 is ramped down. In general, a low priority application is an application that is not critical to providing the application, service, or function to a customer or user. That is, the low priority applications are low-priority activities that are not essential to servicing customers via the system. For example, in a credit card processing system, a daily batch job to process all transactions for a particular day can be run at different times, and not running it at a certain time should not affect the availability of the system to a user. As indicated at 217, during the ramp down of execution of low priority applications on the primary application layer 122, execution of high priority applications are maintained on the primary application layer.

At 220, the third data layer 134 is initialized by copying the second data layer 132 to the third data layer 134 just prior to implementing the software upgrade and configuration change. The third data layer 134 is also coupled to the first application data layer 136.

At 225, one or more applications are initiated on the fallback application layer 124. As further indicated at 227, the one or more applications initiated on the fallback application layer 124 are high priority applications. As further indicated at 229, the high priority applications are applications that are essential to one or more customers. The applications that are initiated on the fallback application layer 124 are the applications that provide functionality to users of the system, and which therefore keep the system up and running for the users. Such applications would be for example the applications that permit a user to continue to make purchases using his or her credit card. The maintaining of the functionality and availability of the system 100 is accomplished by, as indicated at block 230, redirecting users from the primary application layer 122 to the fallback application layer 124, and at 235, blocking users from accessing the primary application layer 122 during the implementation of the upgrade and/or configuration change.

At 240, a protection mode of the first application data layer 136 is implemented during the software upgrade or the configuration change. The protection mode is placed over the first application data layer 136 to ensure data consistency in the system. Applications, services, or functions are provided to a customer or user base using the consistent state of the fallback system, which consists of fallback application layer 124, the third application layer 134 and the first application layer 136. The software upgrade or the configuration change taking place in the second application layer 132 does not interfere with the consistent state of the fallback system.

At 245, the software upgrade or the configuration change is implemented on the second data layer 132. After the completion of the upgrade and/or configuration change on the second data layer 132, the protection mode is disabled at 250. At 255, the users are redirected back to the primary application layer 122. At 260, users are now blocked from accessing the fallback application layer, and at 265, the fallback application layer is disabled. Finally, at 270, execution of the low priority applications is ramped back in on the primary application layer 122.

Figure 3:
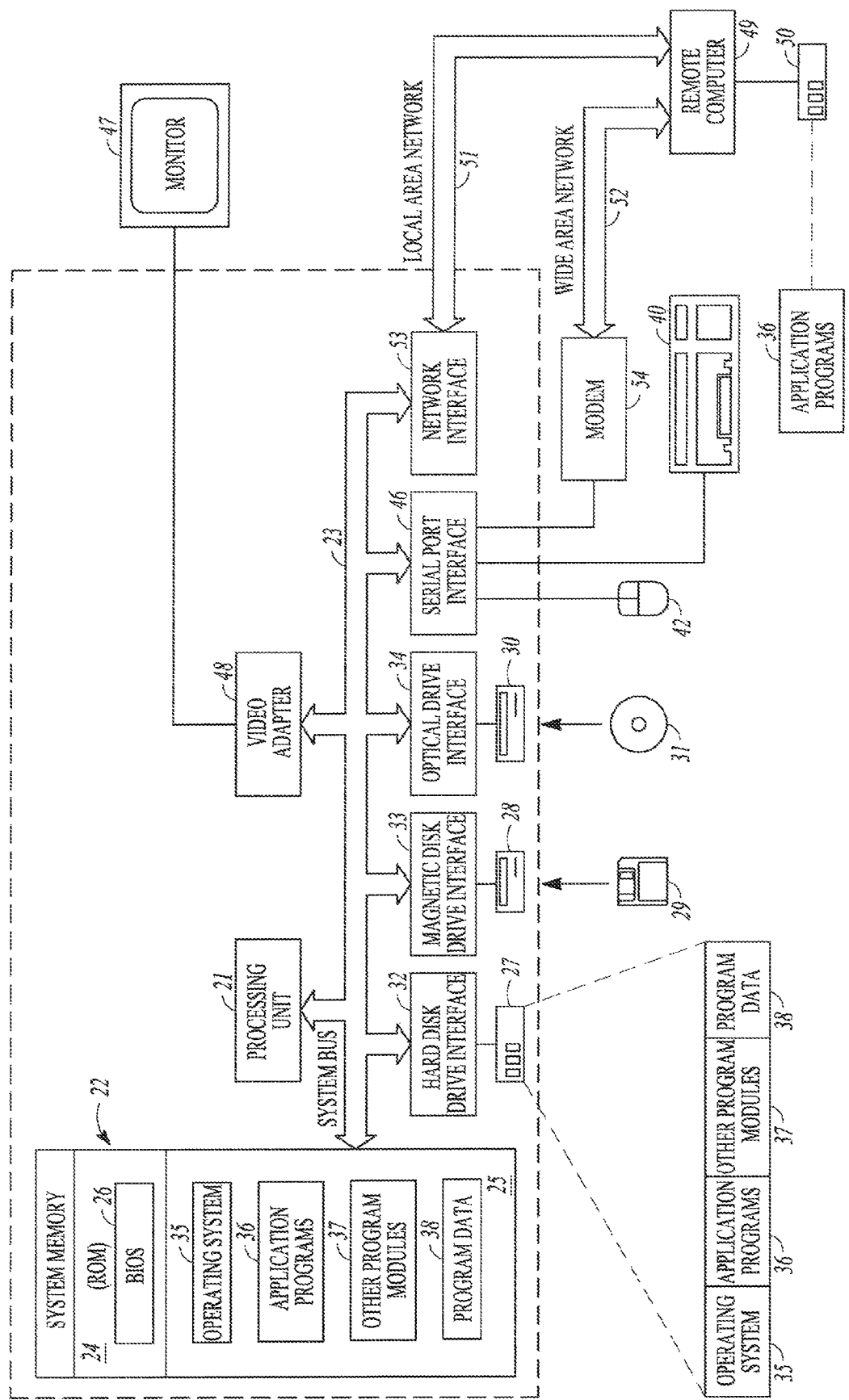
FIG. 3 is a block diagram of an example embodiment of a computer system upon which, and/or in connection with which, one or more embodiments of the present disclosure can execute.

FIG. 3 is an overview diagram of hardware and an operating environment in conjunction with which embodiments of the invention may be practiced. The description of FIG. 3 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 3, a hardware and operating environment is provided that is applicable to any of the servers and/or remote clients shown in the other Figures.

As shown in FIG. 3, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 3 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Thus, an example system, method and machine readable medium for using a fallback system for a software upgrade and/or configuration change have been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing front the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
    a computer processor;
    an application layer coupled to the computer processor, wherein the application layer comprises one or more of a primary application layer and a fallback application layer; and
    a data layer coupled to the application layer, wherein the data layer comprises one or more of:
        a first application data layer that is protected from a software upgrade or a configuration change;
        a second data layer that is modified by the software upgrade or the configuration change; and
        a third data layer that is for use by the fallback application layer during the software upgrade or configuration change;
    wherein the computer processor is operable to:
        execute applications on the primary application layer;
        receive a command to implement a software upgrade or a configuration change to the primary application layer;
        ramp down execution of low priority applications on the primary application layer;
        initialize the third data layer by copying the second data layer to the third data layer just prior to implementing the software upgrade and configuration change, and coupling the third data layer to the first application data layer;
        initiate one or more applications on the fallback application layer, wherein the one or more applications on the fallback application layer use the third data layer;
        redirect users from the primary application layer to the fallback application layer;
        block users from accessing the primary application layer;
        implement a protection mode of the first application data layer during the software upgrade or the configuration change so that the software upgrade or configuration change does not modify data on the first application data layer;
        implement the software upgrade or the configuration change on the second data layer;
        disable the protection mode;
        redirect users back to the primary application layer;
        block users from accessing the fallback application layer;
        disable the fallback application layer; and
        ramp up execution of the low priority applications on the primary application layer.

2. The system of claim 1, wherein the computer processor comprises a cloud server.

3. The system of claim 1, wherein the low priority applications comprise low-priority activities that are not essential to servicing customers via the system.

4. The system of claim 1, wherein during the ramp down of execution of low priority applications on the application layer, the computer processor is operable to maintain execution of high priority applications on the application layer.

5. The system of claim 1, wherein the one or more applications initiated on the fallback application layer comprise high priority applications.

6. The system of claim 5, wherein high priority applications comprise applications that are essential to one or more customers.

7. A computer process comprising:
    executing one or more applications on a primary application layer;
    receiving a command to implement a software upgrade or a configuration change to the primary application layer;
    ramping down execution of low priority applications on the primary application layer;
    initializing a third data layer by copying a second data layer to the third data layer just prior to implementing the software upgrade or configuration change, and coupling the third data layer to a first application data layer, wherein the first application data layer is not affected by the software upgrade or the configuration change, the second data layer is modified by the software upgrade or the configuration change;
    initiating one, or more applications on a fallback application layer, wherein the one or more applications on the tailback application layer use the third data layer;
    redirecting users from the primary application layer to the fallback application layer;
    blocking users from accessing the primary application layer;
    implementing a protection mode of the first application data layer during the software upgrade or the configuration change so that the software upgrade or configuration change does not modify data on the first application data layer;
    implementing the software upgrade or the configuration change on the second data layer;
    disabling the protection mode;
    redirecting users back to the primary application layer;
    blocking users from accessing the fallback application layer;
    disabling the fallback application layer; and
    ramping up execution of the low priority applications on the primary application layer.

8. The computer process of claim 7, wherein the primary application layer and the fallback application layer are part of an application layer; wherein the first application data layer, the second data layer, and the third data layer are part of a data layer; and wherein the data layer is coupled to the application layer.

9. The computer process of claim 8, wherein the application layer and the data layer are coupled to a cloud server.

10. The computer process of claim 7, wherein the low priority applications comprise low-priority activities that are not essential to servicing customers.

11. The computer process of claim 8, comprising maintaining execution of high priority applications on the application layer during the ramping down of execution of low priority applications on the application layer.

12. The computer process or claim 7, wherein the one or more applications initiated on the fallback application layer comprise high priority applications.

13. The computer process of claim 12, wherein high priority applications comprise applications that are essential to one or more customers.

14. A non-transitory computer readable storage medium comprising instructions that when executed by a processor execute a process comprising:
  executing one or more applications on a primary application layer;
  receiving a command to implement a software upgrade or a configuration change to the primary application layer;
  initializing a third data layer by copying a second data layer to the third data layer just prior to implementing the software upgrade or configuration change, and coupling the third data layer to a first application data layer, wherein the first application data layer is not affected by the software upgrade or the configuration change and the second data layer is modified by the software upgrade or the configuration change;
  initiating one or more applications on a fallback application layer, wherein the one or more applications on the fallback application layer use the third data layer;
  redirecting users from the primary application layer to the fallback application layer;
  blocking users from accessing the primary application layer;
  implementing a protection mode of the first application data layer during the software upgrade or the configuration change so that the software upgrade or configuration change does not modify data on the first application data layer;
  implementing the software upgrade or the configuration change on the second data layer;
  disabling the protection mode;
  redirecting users back to the primary application layer;
  blocking users from accessing the fallback application layer; and
  disabling the fallback application layer.

15. The non-transitory computer readable storage medium of claim 14, wherein the primary application layer and the fallback application layer are part of an application layer; wherein the first application data layer, the second data layer, and the third data layer are part of a data layer; and wherein the data layer is coupled to the application layer.

16. The non-transitory computer readable storage medium of claim 14, comprising instructions for:
  ramping down execution of low priority applications on the primary application layer prior to initializing the third data layer; and
  ramping up execution of the low priority applications on the primary application layer after disabling the fallback application layer.

17. The non-transitory computer readable storage medium of claim 14, wherein the low priority applications comprise low-priority activities that are not essential to servicing customers.

18. The non-transitory computer readable storage medium of claim 15, comprising instructions for maintaining execution of high priority applications on the application layer during the ramping down of execution of low priority applications on the application layer.

19. The non-transitory computer readable storage medium of claim 14, wherein the one or more applications initiated on the fallback application layer comprise high priority applications.

20. The non-transitory computer readable storage medium of claim 19, wherein high priority applications comprise applications that are essential to one or more customers.

* * * * *